United States Patent [19]

Thomas

[11] Patent Number: 5,201,154
[45] Date of Patent: Apr. 13, 1993

[54] LANDSCAPE EDGING AND METHODS OF MANUFACTURING AND USING SAME

[75] Inventor: Franklin B. Thomas, Waco, Tex.

[73] Assignee: Easy Gardener, Inc., Waco, Tex.

[21] Appl. No.: 749,201

[22] Filed: Aug. 23, 1991

[51] Int. Cl.⁵ .................. E02D 27/00; A01G 1/08
[52] U.S. Cl. .......................... 52/102; 47/33; 428/180
[58] Field of Search ........... 52/169.5, 169.14, 102; 47/33; 404/6-8; 428/122, 180, 182, 358; 49/489, 498

[56] References Cited

U.S. PATENT DOCUMENTS

| | | | |
|---|---|---|---|
| 1,201,952 | 10/1916 | Ficklen | 404/8 |
| 1,977,021 | 10/1934 | Spencer | 47/33 |
| 2,481,046 | 9/1949 | Scurlock | |
| 2,809,908 | 10/1957 | French | |
| 3,011,602 | 12/1961 | Ensrud et al. | 52/792 |
| 3,279,973 | 10/1966 | Arne | |
| 3,378,949 | 4/1968 | Dorris | 47/33 |
| 3,387,786 | 6/1968 | Rynberk | 47/33 |
| 3,484,989 | 12/1969 | Lazinsky | 47/33 |
| 3,485,449 | 12/1969 | Wilson | 47/33 |
| 3,525,663 | 8/1970 | Hale | 52/792 |
| 3,545,127 | 12/1970 | Jensen | 47/33 |
| 3,706,627 | 12/1972 | Arne | |
| 3,788,001 | 1/1974 | Balfanz, Jr. | 47/33 |
| 3,841,022 | 10/1974 | Thodos | 47/33 |
| 3,911,187 | 10/1975 | Raley | 428/180 |
| 4,190,279 | 4/1977 | Moorman et al. | 47/25 |
| 4,074,479 | 2/1978 | Krupka | 52/102 |
| 4,146,666 | 3/1979 | Houtlosser | 428/180 |
| 4,281,473 | 8/1981 | Emalfarb et al. | 47/33 |
| 4,321,769 | 3/1982 | Tisbo et al. | 47/33 |
| 4,333,979 | 6/1982 | Sciaraffa | 428/179 |
| 4,397,902 | 8/1983 | Resch | 428/119 |
| 4,644,685 | 2/1987 | Tisbo et al. | 47/33 |
| 4,761,923 | 8/1988 | Reum et al | 52/102 |
| 4,939,865 | 7/1990 | Whitcomb et al. | 47/73 |
| 4,955,156 | 9/1990 | Williams | 47/25 |
| 4,965,097 | 10/1990 | Bach | 428/194 |

Primary Examiner—James L. Ridgill, Jr.
Attorney, Agent, or Firm—Arnold, White & Durkee

[57] ABSTRACT

An improved landscape edging is provided that comprises an elongated anchoring panel that has a plurality of hollow, molded projections extending from one or both faces. The interior of each projection is open on the opposite face of the anchoring panel, forming a concave soil socket that becomes filled with soil when the edging is installed in the soil. A trim member is provided along the top of the anchoring panel. Also provided are an extrusion method for manufacturing the edging, in which the projections and sockets are formed by molding the initial extruded form, and a method for using the edging of this invention, comprising excavating a trench, placing the edging therein, and connecting multiple segments of edging to one another.

26 Claims, 3 Drawing Sheets

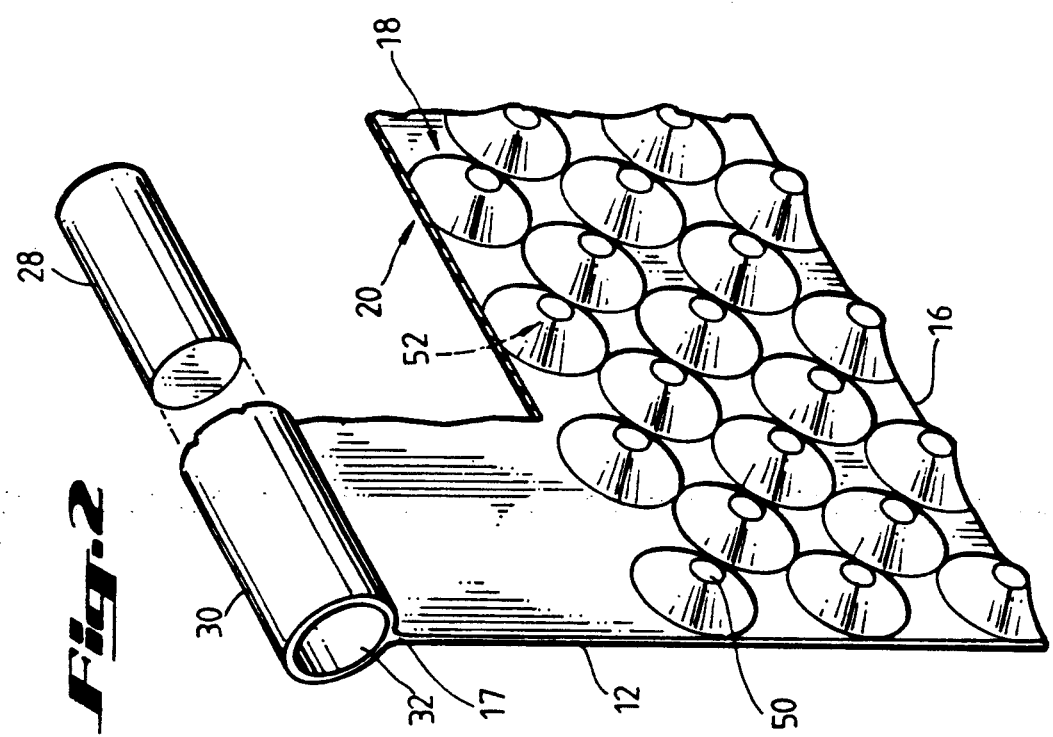
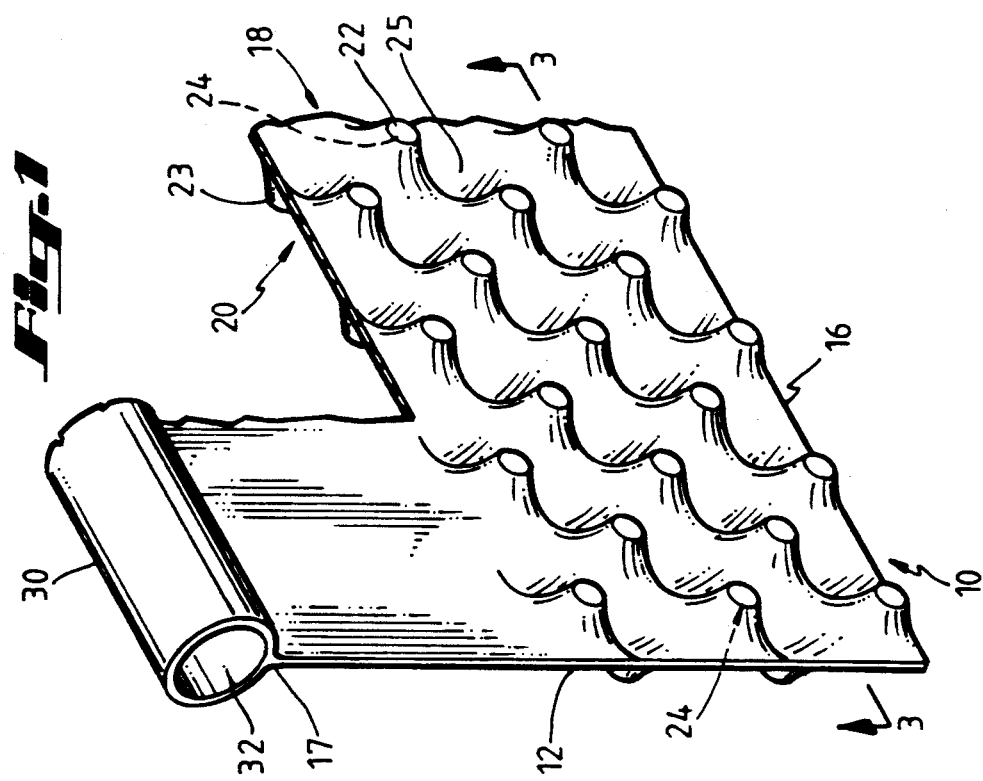

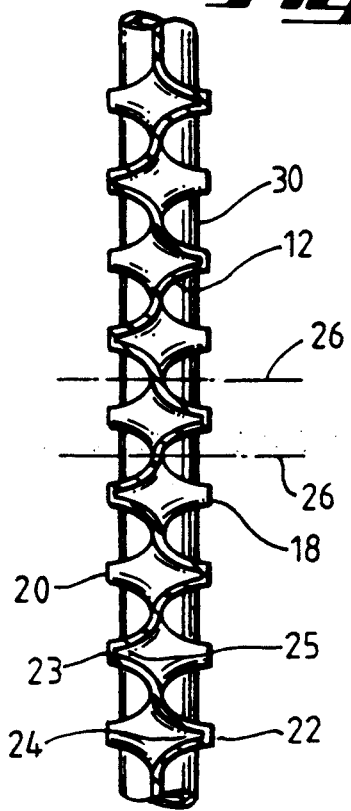
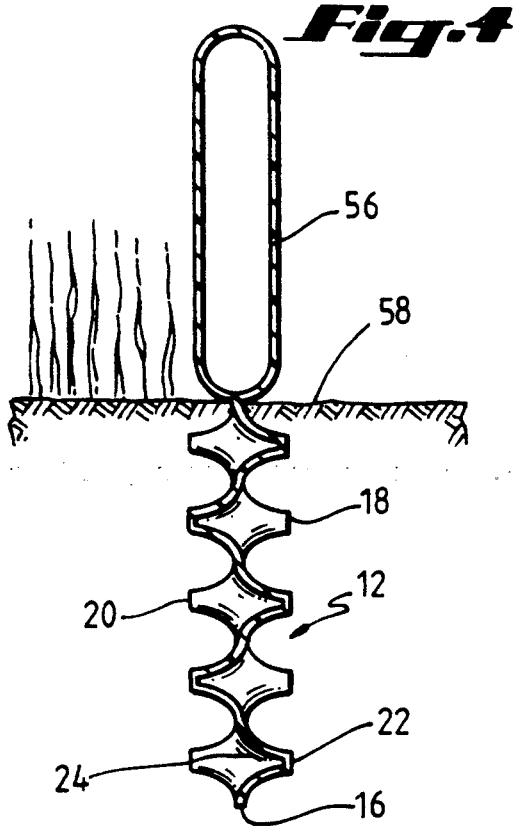
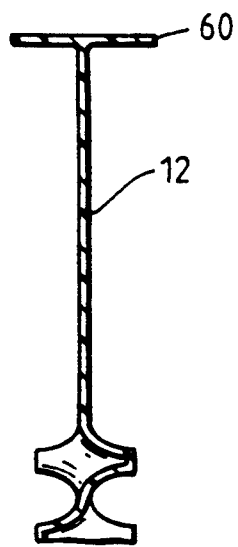
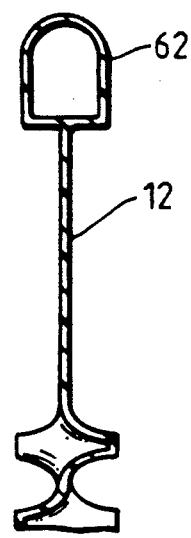
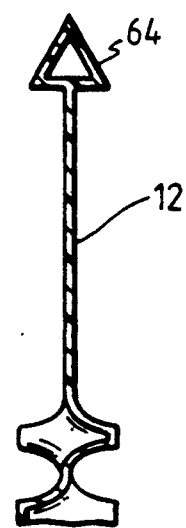

LANDSCAPE EDGING AND METHODS OF MANUFACTURING AND USING SAME

BACKGROUND

1. Field of the Invention

This invention relates to an improved landscape edging product that provides improved resistance to movement after it is installed in the ground and that requires no greater installation effort than do prior art landscape edging products. This invention further relates to methods of manufacturing and using the landscape edging product. In particular, this invention provides an extruded and molded edging product that comprises, when installed, an underground anchoring panel and an integral above ground trim member. The anchoring panel comprises a plurality of soil sockets, which are concave depressions formed in one or both faces of the anchoring panel. The landscape edging structure of this invention provides increased resistance to pulling out of the soil once it is installed.

2. Discussion of Prior Art

In many instances it is desirable to separate different types of plants in a garden and to prevent undesired commingling of plants, in particular to separate a grass lawn area from an area desired to be used as a flower bed or other grassless landscaped area.

It has long been known that a distinct border could be formed between a lawn area and a garden area by implanting an elongated, perhaps flexible edging product along the path desired for the border. Previously known edging products typically comprise a root barrier that is buried vertically in the ground along the border and an integral above ground trim member continuously attached to the top of the root barrier. The root barrier prevents the growth of grass and other shallow roots across the border and also maintains the edging product in position. The trim member forms a visually distinct and preferably attractive border, inhibits the growth of grass and other vegetation across the border, and contains mulches, soils, water, and other materials on the side of the border on which they are placed.

The prior art contains numerous examples of extruded plastic edging materials, some of the known references including U.S. Pat. No. 4,281,473, issued to Emalfarb, et al. on Aug. 4, 1981 for a Landscaping Bed Divider, U.S. Pat. No. 4,321,769, issued to Tisbo, et al. on Mar. 30, 1982 for Edging Strip, U.S. Pat. No. 4,644,685, issued to Tisbo, et al. on Feb. 24, 1984 for Edging Strip, and U.S. Pat. No. 3,841,022, issued to Thodos on Oct. 15, 1974 for Lawn Edging Device.

These edging products are generally installed by excavating a trench of suitable width and depth at the location desired for the border, placing the edging product in position in the trench, with its root barrier portion in the trench below ground level, and closing the trench such that the trim member protrudes through the surface of the soil.

One difficulty encountered with previous edging products is a tendency for them to emerge from the ground over time, either from being pulled or struck by lawn mowers or other tools, or due to heaving of the soil due to freezing and thawing in winter. Reinstallation of edging segments that have emerged from the ground can be as difficult or more difficult than the original installation. It is therefore desirable to provide an edging product that is locked into the soil when it is installed and that provides increased resistance to movement relative to the soil.

Several prior patented devices address anchoring edging products into the ground. See, e.g., U.S. Pat. No. 4,321,769 (1982) which discloses horizontally extending ribs molded integral with the root barrier; U.S. Pat. No. 4,281,473 (1981) which discloses upwardly and outwardly diverging lips formed near the bottom of the vertical root barrier; and U.S. Pat. No. 4,644,685 (1987) which discloses a plurality of ears hingedly formed by cutting flaps in the root barrier, each ear extending away from the root barrier to anchor the edging strip.

In practice, the known prior art edging designs do not adequately anchor the edging into the ground because they do not provide sufficient generally non-vertical surface area in contact with the soil to prevent vertical movement of the edging relative to the soil. Horizontal ribs affixed to the edging which would be large enough to provide the desired horizontal surface area are undesirable because they require a larger trench to be excavated for installation, and because they interfere with the lateral flexibility of the edging and interfere with its use for short radius curves without cutting the ribs. The solution of U.S. Pat. No. 4,644,685, which discloses hinged "ears" extending upward and outward from the root barrier, is undesirable because it does not provide much non-vertical surface area, and because it provides holes in the vertical edging member where the hinged ears are affixed, through which undesirable roots, materials and insects can migrate.

The above discussion demonstrates the need for an improved edging product that will provide increased resistance to emergence from the soil while requiring no additional effort to install. It is further desired that the vertical anchoring panel of the edging be impermeable to plant roots and insects, that it be rigid enough to stand up to the rigors of installation and use, but that it be sufficiently flexible to allow construction of short radius curves in the border it is used to form, and that it have a large non-vertical surface area in contact with the soil to resist vertical movement of the edging with respect to the soil.

SUMMARY OF THE INVENTION

The problems identified above are in large part solved by the device of the present invention. This invention provides an improved configuration employed in the vertically installed, elongated, below-ground anchoring panel of an edging strip that provides substantially increased soil-anchoring capability while retaining the lateral flexibility of a flat piece of plastic and providing an impermeable barrier to roots and insects.

The anchoring panel of this invention is a three dimensional structure, comprising projections and depressions, the projections protruding from a first face of the panel and corresponding with the depressions in a second face of the panel, the depressions being the hollow interiors of the projections. The depressions act as soil sockets to securely anchor the edging structure into the soil. Upon installation, soil enters the sockets and acts against the non-vertical interior surfaces of the sockets to resist subsequent movement of the anchoring panel relative to the soil. Soil also enters the spaces between the projections on the first face of the panel and acts against the exterior surfaces of the projections to provide even further resistance to movement of the anchoring panel. In a preferred embodiment, the anchoring panel has projections protruding from both faces, with soil sockets thereby formed in both faces.

The trim member of this invention is continuously affixed along the upper edge of the anchoring panel, and in a preferred embodiment is extruded integrally with the anchoring panel. The trim member may be of virtually any desired color, shape, size and configuration. In a preferred embodiment, the trim member is round and hollow, which allows connection of two landscape edging segments according to this invention by inserting a cylindrical plug into the hollow trim members of abutting segments. Alternatively, the trim member may be solid, or it may comprise merely a vertical extension of the anchoring panel with no distinct form of its own. After extrusion, the exterior surface of the trim member may be given a roughened or wood grain finish by molding, brushing, or the like.

According to the present invention, edging may be formed by extruding a continuous flat ribbon of plastic material of a desired width and thickness with a trim member integrally extruded along one edge of the ribbon, and then forming the desired projections and depressions by, e.g., shaping the ribbon between molding wheels, or alternatively by pressing on opposite sides of the material when in a moldable state with non-aligned pins to create an anchoring panel in accordance with this invention.

The shape of the projections and sockets of the anchoring panel may alternatively be curved or angular, and their distribution on the anchoring panel may be regular or irregular, so long as they provide convex projections and concave sockets in contact with the soil when the edging is installed. In a preferred embodiment, a regular distribution of projections and sockets is employed, the projections extending from both faces of the anchoring panel and being generally cylindrical or frusto-conical, with the flat ends of the projections being formed in parallel planes on either side of the anchoring panel. A similar structure is described for use as a cellular core structural component in U.S. Pat. No. 3,525,663 (1970), which is incorporated herein by reference. Alternate projection structures include, e.g., the hollow polyhedral embossment pattern described and illustrated in U.S. Pat. No. 2,809,908 (1957), and the pyramidal, truncated pyramidal and frusto-conical patterns described in U.S. Pat. No. 3,011,602 (1961) both of which patents are incorporated herein by reference.

Landscape edging according to this invention is used by excavating a trench along the path selected for the landscape border, placing the anchoring panel of the edging in the trench with the trim member disposed above the surface of the soil, and then filling the trench with soil on both sides of the edging, allowing soil to enter the sockets and to surround the projections. The edging may be positioned with the trim member immediately above and adjacent the soil surface, or alternatively the trim member may be disposed a selected distance above the soil surface or even partially beneath the soil surface.

BRIEF DESCRIPTION OF THE DRAWINGS

So that the manner in which the herein described advantages and features of the present invention, as well as others which will become apparent, are attained and can be understood in detail, more particular description of the invention summarized above may be had by reference to the embodiment thereof which is illustrated in the appended drawings, which drawings form a part of this specification.

It is to be noted, however, that the appended drawings illustrate only exemplary embodiments of the invention and are therefore not to be considered limiting of its scope, for the invention may admit to other equally effective embodiments.

FIG. 1 is a perspective view of a segment of landscape edging in accordance with this invention, illustrating a preferred embodiment having projections protruding from both sides of the anchoring panel and soil sockets thereby formed in both sides of the anchoring panel.

FIG. 2 is a perspective view of a segment of landscape edging in accordance with this invention, illustrating a preferred embodiment having projections protruding from only a first side of the anchoring panel and soil sockets thereby formed in only a second side of the anchoring panel.

FIG. 3 is a horizontal cross sectional view through section 3—3 of FIG. 1, illustrating the projection and socket configuration of the anchoring panel, and in particular illustrating the hinge line of a preferred embodiment.

FIG. 4 is an end-on cross-sectional view of a preferred embodiment showing the invention placed in the soil and having a tall, hollow trim member.

FIG. 5 is a sectional view of an alternative trim member configuration having a "T" shape.

FIG. 6 is a sectional view of an alternative trim member configuration having a portal or semi-cylindrical shape in cross-section. The figure shows the trim member as hollow, although it may be solid as well.

FIG. 7 is a sectional view of an alternative trim member configuration having a triangular cross-section. The figure shows the trim member as solid, although it may be hollow as well.

DETAILED DESCRIPTION OF PREFERRED EMBODIMENTS

Figure 8:
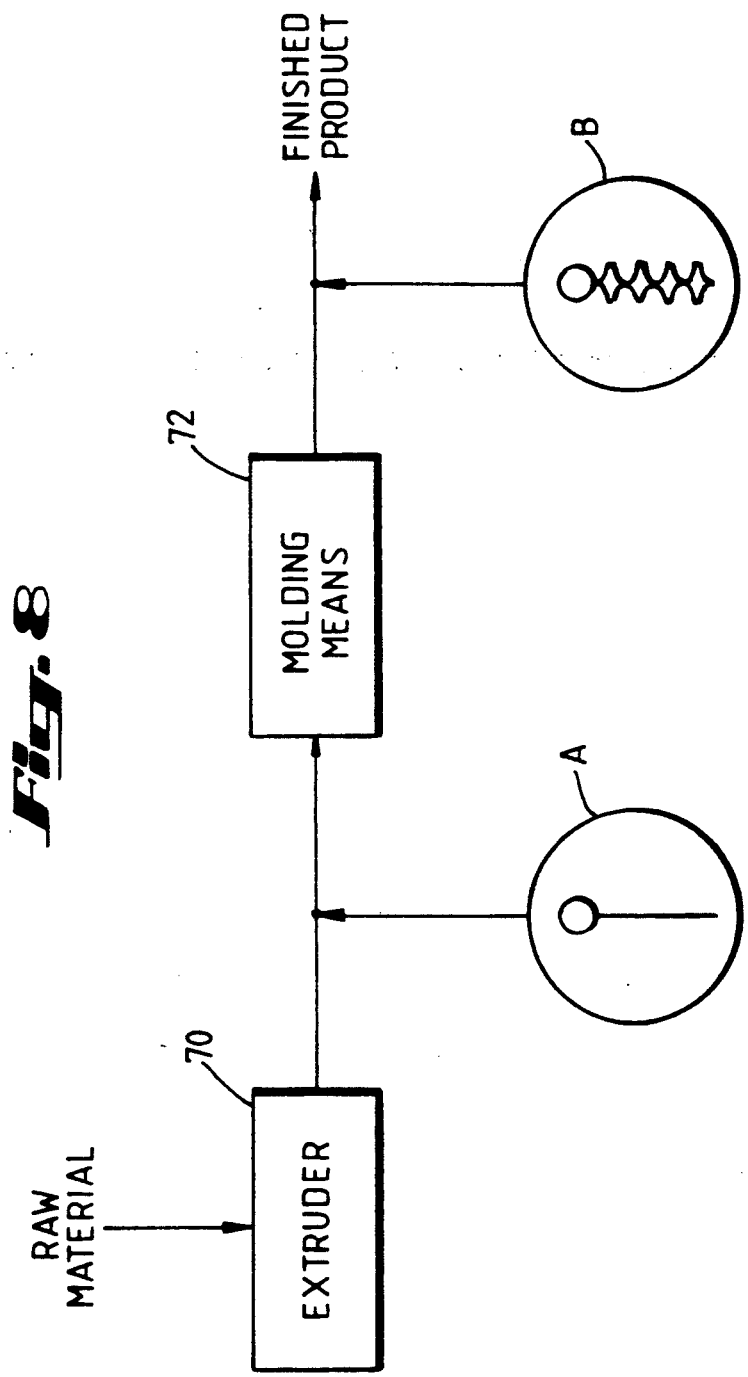
FIG. 8 is a schematic diagram of a method of manufacturing the landscape edging in accordance with the present invention.

FIG. 1 illustrates a preferred embodiment of landscape edging according to this invention. As can be seen, the landscape edging of this embodiment comprises anchoring panel 12 and an integrally molded hollow cylindrical trim member 30 continuously affixed to the top edge 17 of anchoring panel 12. Anchoring panel 12 has first face 18, second face 20 and lower edge 16. Anchoring panel 12 further comprises a plurality of soil sockets which are concave depressions formed in either first face 18, second face 20, or both. In the embodiment shown in FIG. 1, hollow projections 22 extend from first face 18 which create soil sockets 24 and second face 20. Similarly, in this embodiment, additional projections 23 extend from second face 20 forming corresponding soil sockets 25 in first face 18.

Anchoring panel 12, which extends from lower edge 16 to upper edge 17, where it is continuously affixed to trim member 30, may have soil sockets formed over substantially all of its surface, or only over part of its surface as is shown in FIG. 1. In the preferred embodiment illustrated, the portion of anchoring panel 12 in which soil sockets are formed extends from lower edge 16 of anchoring panel 12 to a line intermediate lower edge 16 and upper edge 17 of anchoring panel 12. Other arrangements of projections and sockets on anchoring panel 12 are also considered to be within the scope of this invention.

The landscape edging of FIG. 1 is installed with trim member 30 disposed above the soil surface and with the portion of anchoring panel 12 containing soil sockets 24, 25 disposed below the soil surface. A portion of anchoring panel 12 without soil sockets may be positioned above ground if desired.

Referring now to FIG. 2, an alternative embodiment of this invention is illustrated which comprises anchoring panel 12 with a hollow cylindrical trim member 30 integrally molded to its upper edge throughout its horizontal length. Anchoring panel 12 has first face 18 and second face 20. In this embodiment, hollow substantially frusto-conical projections 50 extend from first face 18 only, forming corresponding substantially frusto-conical soil sockets 52 in second face 20. The edging structure shown in FIG. 2 is installed by placing the portion of anchoring panel 12 containing soil sockets 52 beneath the soil surface at the selected location for the landscape border, with hollow cylindrical trim member 30 above the soil surface, and with as much of the flat upper portion of anchoring panel 12 as desired. Alternatively, the frusto-conical projections 50 and soil sockets 52 shown in FIG. 2 may occupy the entire anchoring panel from lower edge 16 to upper edge 17, which is adjacent to trim member 30.

From FIGS. 1 and 2 it can be appreciated that the presence of projections 22, 50 and soil sockets 24, 52, in anchoring panel 12 provides a greatly expanded surface area, including non-vertical surface area, to provide greatly increased anchoring force acting between the soil and anchoring panel 12 when the edging is installed in the soil, as compared to prior edging structures.

The landscape edging of this invention can be manufactured from any suitable plastic material, which would be well known to a person of skill in the art. The plastic material may be virgin or regrind, and specific examples of suitable materials include, without limitation, polyethylene and polypropylene. Coloring agents may be added to the plastic to make the edging any desired color. The edging of this invention must be stout enough to withstand the rigors of installation and use, while preferably minimizing material costs and weight of the product and providing flexibility for forming short-radius corners when installing the edging. In a preferred embodiment, the anchoring panel is extruded with a thickness of, for example, 0.040 inches, and a width of, for example, 5 inches. A hollow trim member with a circular cross-section, as shown in FIG. 1, may be provided with a wall thickness of, for example 0.040 inches. Of course, the dimensions of landscape edging according to this invention may vary considerably from those given here by way of example.

As shown in FIG. 2, in a preferred embodiment trim member 30 has an elongated hollow cylindrical structure which allows two segments of landscape edging according to this invention to be joined together by use of plug 28. The exterior diameter of plug 28 is approximately equal to the inside diameter of trim member 30, such that a first end of plug 28 may be inserted into an end of hollow trim member 30 of a first piece of landscape edging, and a second end of plug 28 may be inserted into a hollow end of trim member 30 of a second piece of landscape edging, such that when the ends of the first and second pieces of landscape edging are brought into abutting relationship plug 28 causes them to obtain and remain in alignment. Any number of pieces of landscape edging according to this invention may be joined together in this way to create extended lengths of edging as desired.

In an alternative method of installation, multiple segments of edging according to this invention may be joined together by overlapping the ends of the anchoring panels 16 by, for example, 6 inches, and nesting the projections 50 of one of the segments into the sockets 52 of the other segment. In this case, a portion of the trim member 30 is removed from one or both segments such that the trim members of each segment are in end-to-end abutting relation when the anchoring panels overlap by the desired amount. Plug 28 may be used to cause the abutting trim members 30 to obtain and remain in alignment.

FIG. 3 is an upward-looking cross-sectional view of a portion of landscape edging according to this invention along section 3—3 of FIG. 1. FIG. 3 illustrates the general shape of the projections and soil sockets of this embodiment. As can be seen, projections 22, 23 alternately extend from first face 18 and second face 20. Likewise, soil sockets 24, 25 are alternately disposed in first face 18 and second face 20. From the perspective shown in FIG. 3, trim member 30 lies behind anchoring panel 12.

In a preferred embodiment, the projections 22, 23 and soil sockets 24 in anchoring panel 12 are aligned in parallel vertical rows such that hinge lines 26 exist in anchoring panel 12 which intersect neither projections nor sockets and along which the anchoring panel can be easily folded or bent. The existence of hinge lines 26 allows the landscape edging of this embodiment to be easily flexed laterally into small radius curves as may be desired during installation of the landscape edging.

FIG. 4 is a cross-sectional illustration of an end-on view of a preferred embodiment of this invention showing it as it is installed in the soil. This embodiment comprises a hollow, vertically elongated trim member 56 which is well suited for holding back mulches and for other applications where a relatively tall trim member is desired. In this embodiment, the projections 22 and soil sockets 24 extend the entire vertical height of anchoring panel 12 from its lower edge 16 to the base of trim member 56. As can be seen, this embodiment is installed with anchoring panel 12 being disposed completely below soil surface 58, and trim member 56 being disposed immediately above soil surface 58.

FIGS. 5, 6, and 7 illustrate alternative trim member designs. FIG. 5 shows T-shaped trim member 60 affixed to the top of anchoring panel 12. This embodiment may be installed with horizontal panel of trim member 60 resting upon the surface of the ground or at a selected distance above the soil surface. As will be recognized by one skilled in the art, it would be possible to form an L-shaped trim member, or edging with no trim member distinct from the anchoring panel, by manufacturing edging according to this invention and omitting all or part of the horizontal panel 60 shown in FIG. 5. FIG. 6 shows a hollow portal or semi-circular shaped trim member 62, and FIG. 7 shows a triangular solid trim member 64. Any of these trim member shapes may be made hollow or solid within the scope of this invention, and the projections and sockets of anchoring panel 12 may extend up to the base of the trim member 60, 62, 64, while alternatively a section of anchoring panel 12 may be left flat between the bottom of the trim member 60, 62, 64 and the upper most projection 22, as is shown in FIGS. 5, 6, and 7.

FIG. 8 illustrates a method for manufacturing landscape edging according to this invention, comprising the steps of extruding a suitable plastic material in the shape of a flat elongated anchoring panel with the desired trim member integrally extruded along one edge of the anchoring panel with extruder 70. This extrusion is shown in cross-section in detail A. Before the extrusion cools below the moldable state, at least a portion of the anchoring panel is acted upon by molding means 72 to produce projections and soil sockets as shown in detail B. Molding means 72 may comprise a pair of opposed molded wheels configured to mold the anchoring panel into the desired shape. Alternatively, molding means 72 may comprise a plurality of pins which are pressed into the first face 18 of anchoring panel 12 (FIG. 1) and a corresponding plurality of pins pressed into second face 20 of anchoring member 12, as is disclosed in U.S. Pat. No. 3,525,663. In any event, after the projections and soil sockets are molded into at least a portion of anchoring panel 12, the landscape edging is allowed to cool and become fixed in the desired shape to form the completed product.

As was discussed in relation to FIGS. 1 and 2, molding means 72 may form soil sockets in either the first face, the second face, or both faces of anchoring panel 12.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What I claim is:

1. Landscaping edging for forming a boundary between adjacent landscaping areas and for preventing plants such as grass and the like from rooting between adjacent areas, comprising:
   an elongated edging structure including a trim member and an anchoring panel;
   the anchoring panel being generally configured as an elongated wall when installed in the ground and comprising an upper edge, a lower edge, a first face, a second face opposite said first face, and further comprising a plurality of generally frustum shaped hollow projections extending transversely outward from the first face of the anchoring panel, the hollow interior of each projection forming a concave soil socket in the second face of the anchoring panel; and
   the trim member being continuously affixed to the upper edge of the anchoring panel such that the trim member may be located above the soil surface when the anchoring panel is installed in the ground.

2. The invention of claim 1, wherein the hollow projections are configured generally as cones.

3. The invention of claim 1, wherein the hollow projections are configured generally as truncated cones.

4. The invention of claim 1, wherein the hollow projections are configured generally as pyramids.

5. The invention of claim 1, wherein the hollow projections are configured generally as truncated pyramids.

6. The invention of claim 1, wherein the hollow projections are randomly arranged on the anchoring panel.

7. The invention of claim 1, wherein the hollow projections are aligned in parallel vertical rows.

8. The invention of claim 1, wherein the hollow projections are disposed so as to provide vertical hinge lines in the anchoring panel, adapted to allow the anchoring panel to bend laterally during installation in a curved configuration.

9. The invention of claim 1, having soil sockets disposed to occupy less than the entire vertical width of the anchoring panel.

10. The invention of claim 1, wherein the exterior surface of the trim member has a brushed finish.

11. The invention of claim 1, wherein the exterior surface of the trim member has a wood-grain finish.

12. The invention of claim 1, wherein the landscape edging is plastic.

13. Landscaping edging, for forming a boundary between adjacent landscaping areas and for preventing plants such as grass and the like from rooting between adjacent areas, comprising:
   a plurality of elongated edging structures, each of which includes a trim member and an anchoring panel;
   the anchoring panels being generally configured as an elongated wall when installed in the ground and comprising an upper edge, a lower edge, a first face, a second face opposite said first face, and further comprising a plurality of generally frustum shaped hollow projections extending transversely outward from the first face of the anchoring panel, the hollow interior of each projection forming a concave soil socket in the second face of the anchoring panel; and
   the trim members being continuously affixed to the upper edge of the anchoring panel such that the trim member may be located above the soil surface when the anchoring panel is installed in the ground; and
   means for interconnecting the edging structures in end-to-end abutting relationship.

14. The invention of claim 13, wherein the trim member is hollow and tubular and wherein said interconnecting means comprises an insert plug, the ends of which are inserted into the abutting ends of the trim members of each adjacent edging structure.

15. Landscaping edging for forming a boundary between adjacent landscaping areas and for preventing plants such as grass or the like from rooting between adjacent areas, comprising:
   an elongated edging structure including a trim member and an anchoring panel;
   the anchoring panel being generally configured as an elongated wall when installed in the ground and comprising an upper edge, a lower edge, a first face, a second face opposite said first face, and further comprising a plurality of generally circular hollow projections extending transversely outward from the first face of the anchoring panel, the hollow interior of each projection forming a concave soil socket in the second face of the anchoring panel, and still further comprising a plurality of hollow projections extending transversely from the second face of the anchoring panel, the hollow interior of each projection forming a concave soil socket in the first face of the anchoring panel; and the trim member being continuously affixed to the upper edge of the anchoring panel such that the trim member may be located above the soil surface when the anchoring panel is installed in the ground.

16. The invention of claim 15, wherein the hollow projections are configured generally as cones.

17. The invention of claim 15, wherein the hollow projections are configured generally as truncated cones.

18. The invention of claim 15, wherein the hollow projections are randomly arranged on the anchoring panel.

19. The invention of claim 15, wherein the hollow projections are aligned in parallel vertical rows.

20. The invention of claim 15, wherein the hollow projections are disposed so as to provide vertical hinge lines in the anchoring panel, adapted to allow the anchoring panel to bend laterally during installation in a curved configuration.

21. The invention of claim 15, having soil sockets disposed to occupy less than the entire vertical width of the anchoring panel.

22. The invention of claim 15, wherein the exterior surface of the trim member has a brushed finish.

23. The invention of claim 15, wherein the exterior surface of the trim member has a wood-grain finish.

24. The invention of claim 15, wherein the landscape edging is plastic.

25. Landscaping edging, for forming a boundary between adjacent landscaping areas and for preventing plants such as grass or the like from rooting between adjacent areas, comprising:

a plurality of elongated edging structures each of which includes a trim member and an anchoring panel;

each anchoring panel being generally configured as an elongated wall when installed in the ground and comprising an upper edge, a lower edge, a first face, a second face opposite said first face, and further comprising a plurality of generally circular hollow projections extending transversely outward from the first face of the anchoring panel, the hollow interior of each projection forming a concave soil socket in the second face of the anchoring panel, and still further comprising a plurality of hollow projections extending transversely from the second face of the anchoring panel, the hollow interior of each projection forming a concave soil socket in the first face of the anchoring panel; and each trim member being continuously affixed to the upper edge of the anchoring panel such that the trim member may be located above the soil surface when the anchoring panel is installed in the ground; and means for interconnecting the edging structures in end-to-end abutting relationship.

26. The invention of claim 23, wherein the trim member is hollow and tubular and wherein said interconnecting means comprises an insert plug, the ends of which are inserted into the abutting ends of the trim members of adjacent edging structures.

* * * * *

UNITED STATES PATENT AND TRADEMARK OFFICE
CERTIFICATE OF CORRECTION

PATENT NO. : 5,201,154

DATED : April 13, 1993

INVENTOR : Franklin B. Thomas

It is certified that error appears in the above-identified patent and that said Letters Patent is hereby corrected as shown below:

In column 10, line 29 (claim 26) change "23" to --25--.

Signed and Sealed this

Fourteenth Day of December, 1993

Attest:

BRUCE LEHMAN

*Attesting Officer*     *Commissioner of Patents and Trademarks*